(12) United States Patent
Brunhuber et al.

(10) Patent No.: US 11,426,797 B2
(45) Date of Patent: Aug. 30, 2022

(54) METHOD FOR GENERATING A COMPONENT BY A POWER-BED-BASED ADDITIVE MANUFACTURING METHOD AND POWDER FOR USE IN SUCH A METHOD

(71) Applicant: Siemens Energy Global GmbH & Co. KG, Munich (DE)

(72) Inventors: Christian Brunhuber, Auerbach (DE); Martin Schäfer, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 273 days.

(21) Appl. No.: 16/330,505

(22) PCT Filed: Aug. 30, 2017

(86) PCT No.: PCT/EP2017/071725
§ 371 (c)(1),
(2) Date: Mar. 5, 2019

(87) PCT Pub. No.: WO2018/046361
PCT Pub. Date: Mar. 15, 2018

(65) Prior Publication Data
US 2019/0193160 A1  Jun. 27, 2019

(30) Foreign Application Priority Data

Sep. 6, 2016  (DE) ..................... 10 2016 216 859.2

(51) Int. Cl.
*B22F 10/20*  (2021.01)
*B22F 5/00*  (2006.01)
(Continued)

(52) U.S. Cl.
CPC ............. *B22F 10/20* (2021.01); *B22F 1/17* (2022.01); *B22F 5/009* (2013.01); *B22F 10/28* (2021.01);
(Continued)

(58) Field of Classification Search
CPC .......... B22F 10/20; B22F 10/28; B22F 1/025; B22F 5/009; C22C 1/0433; C22C 27/04; C22C 19/00; B33Y 70/00; Y02P 10/25
See application file for complete search history.

(56) References Cited

U.S. PATENT DOCUMENTS 9,095,900 B2  8/2015  Hertter
9,844,812 B2  12/2017  Rickenbacher
(Continued)

FOREIGN PATENT DOCUMENTS

| CH | 705662 A1 | 5/2013 |
| CN | 102672365 A | 9/2012 |

(Continued)

OTHER PUBLICATIONS

Hagedorn, Y. C., et al. "Processing of nickel based superalloy MAR M-247 by means of High Temperature-Selective Laser Melting (HT-SLM)." High Value Manufacturing: Advanced Research in Virtual and Rapid Prototyping—Proceedings of the 6th International Conference on Advanced Research and Rapid Prototyping. 2013. pp. 291-295.

(Continued)

*Primary Examiner* — John A Hevey
(74) *Attorney, Agent, or Firm* — Lempia Summerfield Katz LLC

(57) ABSTRACT

The disclosure relates to a powder and a method for generating a component by a powder-bed-based additive manufacturing method, such as laser melting. The powder includes particles having a core and a shell. The particles (Continued)

have an alloy composition of the component. The concentration of higher-melting alloy elements is greater in the shell and the concentration of lower-melting alloy elements is greater in the core, wherein the surface of the particles is higher in comparison with particles with a constant alloy composition. This advantageously prevents the particles from caking together in the powder bed during the production of the component, and so the powder bed may also be subjected to high preheating temperatures of up to 1000° C.

11 Claims, 2 Drawing Sheets

(51) Int. Cl.
*B33Y 70/00* (2020.01)
*C22C 19/00* (2006.01)
*C22C 27/04* (2006.01)
*B22F 10/28* (2021.01)
*C22C 1/04* (2006.01)
*B22F 1/17* (2022.01)

(52) U.S. Cl.
CPC ............ *B33Y 70/00* (2014.12); *C22C 1/0433* (2013.01); *C22C 19/00* (2013.01); *C22C 27/04* (2013.01); *Y02P 10/25* (2015.11)

(56) References Cited

U.S. PATENT DOCUMENTS

| | | |
|---|---|---|
| 2004/0056022 A1 | 3/2004 | Meiners |
| 2011/0103961 A1 | 5/2011 | Glover et al. |
| 2013/0228302 A1* | 9/2013 | Rickenbacher ......... B22F 9/082 164/492 |
| 2015/0093589 A1* | 4/2015 | Mazyar ................... B22F 1/025 428/570 |
| 2015/0132173 A1 | 5/2015 | Bruck |
| 2015/0336219 A1 | 11/2015 | Bruck |
| 2016/0167133 A1 | 6/2016 | Yurko |
| 2016/0175929 A1 | 6/2016 | Colin et al. |
| 2017/0021456 A1* | 1/2017 | Varetti ................ B29C 35/0805 |
| 2017/0189962 A1 | 7/2017 | Kestler |
| 2018/0104741 A1 | 4/2018 | Heinrichsdorf |

FOREIGN PATENT DOCUMENTS

| | | | |
|---|---|---|---|
| CN | 105642885 A | 6/2016 | |
| DE | 9018138 U1 | 2/1996 | |
| DE | 19823341 A1 * | 12/1999 | ............. C25D 17/16 |
| DE | 19823341 A1 | 12/1999 | |
| DE | 102010046468 A1 | 3/2012 | |
| DE | 102015118441 A1 | 5/2016 | |
| DE | 102015205316 A1 | 9/2016 | |
| EP | 1355760 B1 | 5/2005 | |
| EP | 14301 U1 | 7/2015 | |
| WO | WO-2015112730 A1 * | 7/2015 | ................ B22F 5/04 |
| WO | WO2015112730 A1 | 7/2015 | |

OTHER PUBLICATIONS

PCT International Written Opinion of the International Searching Authority dated Aug. 30, 2017, for corresponding PCT/EP20171071725.

Tian, Jia-Jia, et al. "An effective approach for creating metallurgical self-bonding in plasma-spraying of NiCr—Mo coating by designing shell-core-structured powders." Acta Materialia 110 (2016): 19-30.

German Office Action for related German application No. DE 10 2016 216 859.2 dated Aug. 30, 2017.

Singapore Search Report and Written Opinion for Singapore Patent Application 11201901816Q dated Feb. 18, 2020.

Chinese Office Action for Chinese Application No. 201780054773.X dated Aug. 3, 2020.

European Office Action for European Application No. 17 768 686.2-1103 dated Jul. 9, 2021.

* cited by examiner

METHOD FOR GENERATING A COMPONENT BY A POWER-BED-BASED ADDITIVE MANUFACTURING METHOD AND POWDER FOR USE IN SUCH A METHOD

The present patent document is a § 371 nationalization of PCT Application Serial No. PCT/EP2017/071725, filed Aug. 30, 2017, designating the United States, which is hereby incorporated by reference, and this patent document also claims the benefit of German Patent Application No. DE 10 2016 216 859.2, filed Sep. 6, 2016, which is also hereby incorporated by reference.

TECHNICAL FIELD

The disclosure relates to a method for generating a component, (e.g., composed of a superalloy), by a powder-bed-based additive production method. With this method, the component is built up layer by layer in a powder bed by the melting of particles forming the powder bed by an energy beam such as, for example, an electron beam or a laser beam. In this case, the powder bed is preheated to a temperature below the melting temperature of the particles, before and while the particles are melted. The disclosure further relates to a powder suitable for use in a powder-bed-based additive production method, the powder including a metal alloy.

BACKGROUND

A method of the type specified at the outset is known from European Patent Publication No. EP 1 355 760 B1, for example. The method for selective laser melting (SLM) that is discussed in the document is said to be suitable for processing of materials with high melting points. Given the interest that exists in producing components having a low degree of inherent stresses from materials with high melting points as well, the document proposes that before the powder is melted, the powdered material is preheated to a temperature of at least 500° C. This temperature, however, is below the melting point of the material of the powder. Alternative methods are selective laser sintering (SLS) and electron beam melting (EBM).

With SLM, SLS, and EBM, the components are produced layer by layer in a powder bed. These methods are therefore also referred to as powder-bed-based additive manufacturing methods. One layer at a time of the powder is generated in the powder bed, and is subsequently subjected to melting or sintering by the energy source (laser or electron beam) locally in those regions in which the component is to form. In this way the component is generated successively, layer by layer, and on completion may be removed from the powder bed.

Furthermore, according to Y.-C. Hagedorn et al., "Processing of Nickel based superalloy MAR M-247 by High Temperature Selective Laser Melting (HT-SLM)", High Value Manufacturing, pages 291 to 295, London 2014, there is a desire for superalloy materials as well, in powder form, to be processed by selective laser melting. In this case, however, the problem occurs that the products produced are subject to high inherent stresses, and that cracks may occur because of this fact. The authors therefore propose relatively intensive preheating of the powder.

It is known, furthermore, that powders which are highly preheated undergo caking to one another in accordance with the mechanism of sintering. This gives rise to the problem, in the case of selective laser melting, that the powder bed solidifies and may also stick to the surface of the component produced. Cleanly removing the component produced from the powder bed is then no longer possible. Moreover, the powder cannot be reused if the particles undergo caking to one another. This makes the method more expensive, because raw material regularly has to be discarded. The caking/sticking of the powder bed may additionally lead to an uneven surface of the powder bed. This complicates the application of further powder layers, and may give rise to geometric defects in the surface of the powder bed. As a result, the quality of the components under production is impaired.

German Patent Publication No. DE 198 23 341 A1 discloses powders which include a metal alloy. The particles of this powder have a core and a shell, with the melting point of the alloy fraction in the core being higher than that of the shell. According to the document indicated above, these particles are said to be especially suitable for producing components by sintering. The reason given for this is that the particles melt more quickly than if they were fabricated homogeneously from the desired alloy composition. Accordingly, lower sintering temperatures are possible on sintering treatment. During the sintering treatment, the desired alloy composition comes about at the end in the sintered component.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an object of the disclosure to specify a method for generating a component, more particularly composed of a superalloy, by a powder-bed-based additive production method, that allows the production of components which satisfy the requirements imposed on the components. It is an object of the disclosure, moreover, to specify a powder which finds use in such a method.

The object is achieved by the method specified at the outset, by virtue of the fact that a powder composed of a metal alloy is used, with particles of powder including a core and a shell. There is a first metallic alloy fraction in the core and there is a second metallic alloy fraction in the shell. The first and second metallic alloy fractions may therefore include a metal or a metal alloy. The first alloy fraction has a lower melting temperature than the second alloy fraction.

The effect of the difference in alloy composition between core and shell, with even a core or a shell composed only of a metal being understood as constituting a differing alloy composition, is that both the alloy composition of the core and the alloy composition of the shell are different from the alloy composition of the metal alloy of the particle. The alloy composition of a particle in question therefore includes the totality of all the alloying elements forming the particle. The alloy compositions in each case of the core and of the shell are selected such that in totality, taking account of the respective mass fraction of core and of shell in the particle, the desired metal alloy of the powder is formed. For the ultimate formation of alloy, a melting or sintering operation of the powder is then used, leading to diffusion of the alloy fractions and to the formation of the desired metal alloy composition (more on this hereinafter). Another factor to be taken into account is that alloying elements possibly evaporate during the production operation and therefore are present in the particles (e.g., in the core and/or in the shell) at a concentration which compensates the evaporation loss.

In contradistinction to the proposal in the above-recited German Patent Publication No. DE 198 23 341 A1, therefore, the disclosure herein uses the more highly melting alloy fraction as the shell of the particles, even though this brings about the very opposite of the purpose intended in the document, namely that incipient melting of the particle surfaces is achieved only at higher temperatures. It has emerged, however, that the particles, on processing in powder-bed-based additive manufacturing methods, have far less of a tendency to cake to one another in the powder bed (that is, outside the volume of the component under production). In the case of methods such as laser melting and laser sintering, therefore, caking may be prevented by sintering or at least incipient sintering of the powder particles, so making these particles available advantageously for subsequent manufacturing operations. A further advantage is that because of the lower propensity for incipient sintering of the coated particles, the removal of powder from internal cavities is facilitated, so enabling the production of complex, delicate structures, of the kind occurring, for example, in the case of the leading and trailing edges of gas turbine blades.

In the case of electron beam melting, it is easier to carry out only incipient sintering of the particles in the powder bed, in order to prevent the effect known as the smoke effect. This refers to a swirling of the metallic particles owing to the electrical fields which act during electron beam melting; in this context it is sufficient for even a certain adhesion of the particles in the powder bed to one another to be generated, this adhesion may be reversible, e.g., redissoluble. Incipient sintering therefore refers to an incomplete sintering, the effect instead being that of the generation of a certain dissoluble adhesion between the particles with one another.

The layer on the particles may advantageously have a thickness of 0.1 micrometers (µm) to 3 µm. This thickness on the part of the shell is sufficient to provide the core of the particles with adequate shielding, ruling out the effect of any caking. Here it is advantageous for the particles to have a size of at least 10 µm and at most 50 µm. In some examples, the average particle size is in a range of 25 µm to 30 µm. This provides that the core has sufficient volume to allow the establishment of a desired alloy composition between core and shell. The dimensioning of the particle diameter, the core diameter, and the thickness of the shell, permits the establishment of the alloy composition of the overall particles.

A superalloy used is advantageously a nickel-based superalloy. These superalloys may be used, for example, to produce the blades of gas turbines. In the case of this material, the powder is advantageously preheated to a temperature of at least 800° C. and at most 1000° C., or even to at most 1200° C. Moreover, by the apparatus which introduces the heat into the powder bed for the purpose of preheating, it is provided that the cooling after the production of the component occurs at a rate of at most 1° C. per second. This may be used advantageously to allow the formation, within the component made from the nickel-based superalloy, of γ' precipitates of intermetallic phases, which characterize a microstructure of the nickel-based superalloy. For the formation of these precipitates, it is general knowledge that the growth of the cuboid γ' precipitates is suppressed if cooling is too rapid. If the component is cooled down more slowly than at 1° C. per second, however, the stated precipitates do come about if the temperature is below the γ' solidus temperature. The solidus temperature is at 1150° C. To provide slow cooling from this temperature level, the temperature of the powder bed is slightly lower. A temperature level of between 900° C. and 1000° C. has proven advantageous in this respect.

Furthermore, the object is achieved by the powder specified at the outset, with particles of this powder includes a core and a shell. There is a first metallic alloy fraction in the core and a second metallic alloy fraction in the shell, wherein the second metallic alloy fraction has an alloy composition which differs from the first alloy fraction. The first alloy fraction has a lower melting temperature than the second alloy fraction. When a powder of this kind is used in a powder-bed-based additive manufacturing method, the advantages stated above are achieved, these advantages being valid for the powder likewise.

According to one advantageous embodiment of the powder, the core of the particles includes primarily nickel (1455° C.) and the shell of the particles includes one or more of the following metals: cobalt (1495° C.), iron (1538° C.), chromium (1907° C.), molybdenum (2623° C.), tantalum (3020° C.), or tungsten (3422° C.). The temperature figures in parentheses indicate the melting temperature of the respective metals. This allows the core (e.g., measured on the target alloy dictated by the particles) to contain a super-proportionally large quantity of nickel and for the shell to include a super-proportionally large quantity of an element having a melting point higher than that of nickel, (e.g., Co, Cr, Mo, Wo, or Ta). The alloys which may be generated with these metals are nickel-based alloys, which may be suitable for high-temperature applications, such as turbine components, (e.g., turbine blades). These materials, processed to form powders, may be employed advantageously in an additive production method, where heating of the powder bed is possible, because the construction of the powder particles with core and shell advantageously prevents the powder bed sintering together or renders such sintering amenable to targeted influencing (e.g., incipient sintering).

The particles, advantageously, may have the alloy composition, for example, of Mar M 247, CM 247 LC or Rene 80, wherein the shell may include tungsten or else, in the case of Rene 80, chromium. The composition of these alloys is apparent from Table 1.

TABLE 1

| | Alloy | | | | | | | | | | | | |
|---|---|---|---|---|---|---|---|---|---|---|---|---|---|
| | C | Cr | Co | W | Mo | Ta | Al | Ti | Hf | B | Zr | Nb | Ni |
| Mar M 247 | 0.15 | 8.4 | 10.0 | 10.0 | 0.7 | 3.0 | 5.5 | 1.0 | 1.5 | 0.015 | 0.05 | — | BAL |
| CM 247 LC | 0.07 | 8.1 | 9.2 | 9.5 | 0.5 | 3.2 | 5.6 | 0.7 | 1.4 | 0.015 | 0.015 | — | BAL |
| Rene 80 | — | 10.0 | 9.5 | 6.0 | 4.0 | 5.0 | 4.2 | 3.5 | 0.2 | — | — | 0.5 | BAL |

Furthermore, the alloy compositions may also include a nickel-based single-crystal alloy, such as CMSX-4, for example. Appropriate cooling of the powder bed allows components produced additively with such alloy to be produced with a monocrystalline structure and/or a structure having very large grains. Examples of single-crystal alloys based on nickel are apparent from Table 2.

TABLE 2

| Alloy | Cr | Al | Ti | Ta | W | Mo | Co | Re | Hf | others |
|---|---|---|---|---|---|---|---|---|---|---|
| CMSX-4 | 6.4 | 5.5 | 0.9 | 6.3 | 6.2 | 0.5 | 9.3 | 2.8 | 0.7 | — |
| RR 2000 | 10 | 5.5 | 4 | — | — | 3 | 15 | | | V1.0 |
| PWA 1484 | 5.0 | 5.7 | — | 8.7 | 5.9 | 1.9 | 10.0 | 3.0 | 0.1 | — |
| CMSX-10 | 2 | 5.7 | 0.2 | 8 | 5 | 0.4 | 3 | 6 | 0.03 | NB 0.1 |
| CMSX-10M | 2 | 5.78 | 0.24 | 8.2 | 5.4 | 0.4 | 1.7 | 6.5 | 0.03 | NB 0.08 |
| Rene N6 | 4.2 | 5.75 | — | 7.2 | 6 | 1.4 | 12.5 | 6 | 0.15 | C 0.05, B 0.004 |
| TMS-80 | 2.9 | 5.8 | — | 5.8 | 5.8 | 1.9 | 11 | 4.9 | 0.1 | Ir 3 |

The shell of the particles of the single-crystal alloys may include tungsten and/or tantalum. To achieve an extremely high melting point in the shell, it is possible according to one advantageous embodiment for the shell to consist to an extent of more than 99 mass %, or completely, of a single metallic alloy element. Consisting completely of one alloy element, however, strains the bounds of what is technically possible, and so up to one mass % of other alloy constituents may be allowed. The advantage of generating the shell only from a single metallic alloy element is that the shell contains substantially no alloy compositions which, owing to formation of eutectic mixtures, normally have a lower melting point than their elemental alloy constituents. As a result, it is possible advantageously to raise the melting temperature optimally through choice of the corresponding metal, specifically up to the melting temperatures (indicated) respectively above. The greatest increase in the melting temperature of the shell may be achieved, advantageously, with the alloy element of the relevant alloy composition of the particle that has the highest melting temperature.

A prerequisite for the selection of the alloy element of the shell is that this element is present to a sufficient extent in the alloy composition of the particle. In order to be able to form a shell of sufficient thickness, an alloy fraction of 5 mass % is considered to be sufficient. Alloy fractions of up to 10% lead to thicker shells, which have the advantageous effect of protecting the core more effectively. Larger alloy fractions would result in even thicker shells; however, with regard to the formation of alloy during the melting of the particles, this is regarded as a disadvantage, because it would result in excessive separation of the alloy owing to division of the alloy elements between the core and the shell, respectively, of the particle. In this case, therefore, according to one advantageous embodiment, there is at least one alloy element of the shell that is also present in the core, the concentration of this alloy element in the core being lower than in the shell. In other words, the shell is produced in a required thickness, and, so to speak, excess material of the alloy element forming the shell is not employed to increase the thickness of the shell further, but is instead present as an alloy element in the core. This shortens the necessary process of diffusion of the alloy element of the shell into the core, with the advantageous effect of supporting the formation of alloy during the melting of the powder and/or reducing the required diffusion processes in the component as it forms.

BRIEF DESCRIPTION OF THE DRAWINGS

Further details of the disclosure are described below with reference to the drawing. Identical or corresponding elements in the drawing are each provided with the same reference symbols and are explained more than once only insofar as there are differences between the individual figures.

DETAILED DESCRIPTION

Figure 1:
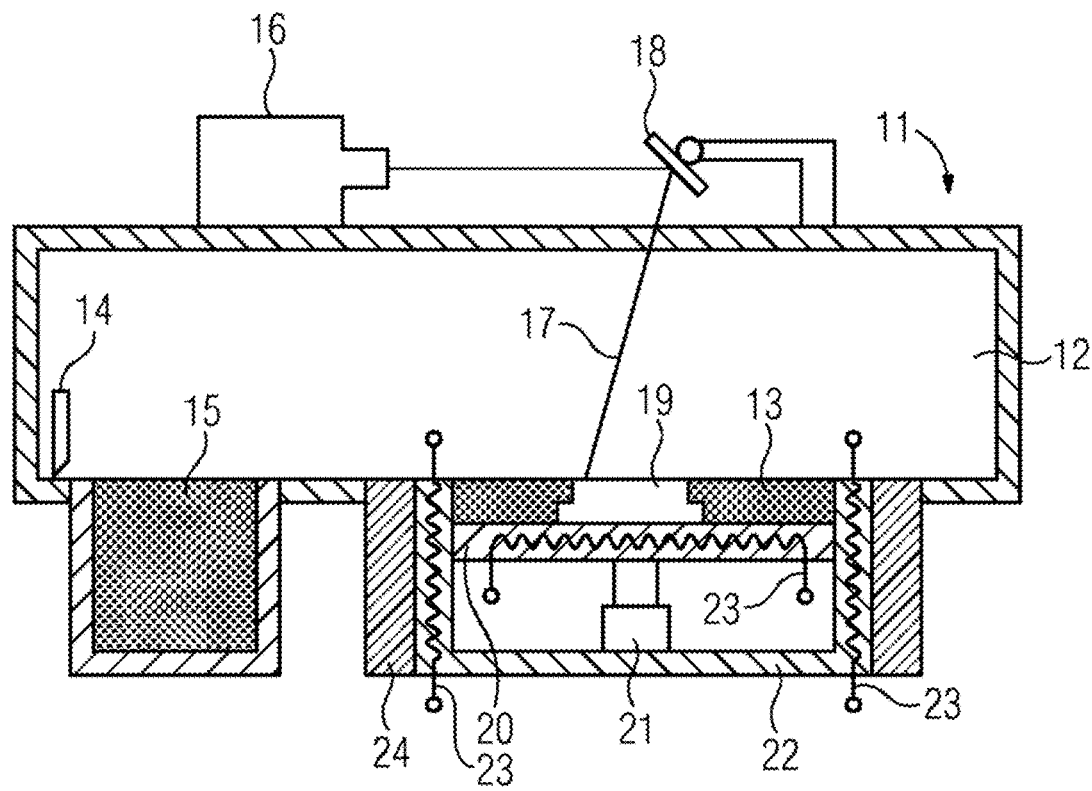
FIG. 1 depicts, in section, a laser melting unit in which an exemplary embodiment of the method is carried out.

Represented schematically in FIG. 1 is a unit 11 for laser melting. This unit has a process chamber 12 in which a powder bed 13 may be produced. To produce, respectively, one layer of a powder bed 13, a spreader in the form of a doctor blade 14 moves over a powder store 15 and subsequently over the powder bed 13, so forming a thin layer of powder in the powder bed 13. A laser 16 then generates a laser beam 17, which is moved by an optical deflection apparatus with mirror 18 over the surface of the powder bed 13. At the point of impingement of the laser beam 17, the powder is melted, to form a component 19.

The powder bed 13 comes about on a building platform 20, which may be lowered step by step, by the thickness of one powder layer in each case, in a pot-shaped housing 22 by an actuator 21. In the housing 22 and also in the building platform 20, heating devices 23 are provided in the form of electrical resistance heaters (induction coils are an alternative option), which are able to preheat the component 19 being formed and also the particles of the powder bed 13. To permit the energy required for preheating, on the outside of the housing 22 there is insulation 24 of low thermal conductivity.

Figure 2:
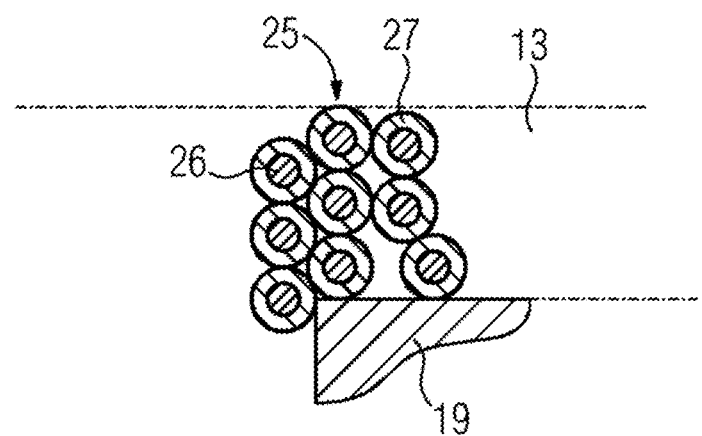
FIGS. 2 to 4 depict selected acts in the implementation of the method according to FIG. 1, with a small detail of the component under production being shown in section.

Represented in FIG. 2 is an edge of the component 19 to be produced, which may be produced, for example, in a unit according to FIG. 1. This component is located in the powder bed 13, the borders of which are indicated by a dash-dotted line. Selected particles 25 from the powder bed 13 are also shown, including the material of a nickel-based alloy. The component to be produced may be, for example, a turbine blade.

The particles 25 include in each case of a core 26 and a shell 27. The core 26 primarily includes nickel and further includes the nickel-based alloy. The shell 27 includes, for example, tungsten and otherwise of elemental alloy impurities to a technically irrelevant extent. Accordingly, the surface of the particles 25 has a melting temperature of above 3400° C. This allows the powder bed to be preheated at up to 1000° C. without adjacent particles 25 becoming caked together.

Represented schematically in FIG. 2 (as also in FIGS. 3 and 4) are the particles 25; the size proportions between the core 26 and the shell 27 are not true to scale. Additionally, a discrete transition between core 26 and shell 27, as shown in FIG. 2, is not absolutely necessary. Gradient layers are also conceivable, in which a transition between core 26 and shell 27 is not abrupt but instead occurs with a concentration gradient (not shown). This advantageously supports the diffusion processes which lead, by melting of the particles, to the formation of alloy in the composition intended for the component. For the melting temperature at the surface of the particles 25, all that is necessary is that the shell 27 there has the composition required to achieve the melting temperature present there.

Gradient layers may also be formed during the production of the particles themselves, if that process is accompanied by certain diffusion events of alloy elements in the core 26 and/or in the shell 27. Possible production methods for the particles include, for example, galvanic or electroless electrochemical coating processes, of the kind already described in German Patent Publication No. DE 198 23 341 A1. Another possibility is that of production by atomic layer deposition (ALD) processes as known in the art. In this case, layers of atoms are applied to the particles so as to form, e.g., very thin layers. To generate the required layer thickness, a number of coating acts may be necessary in the ALD process.

Figure 3:
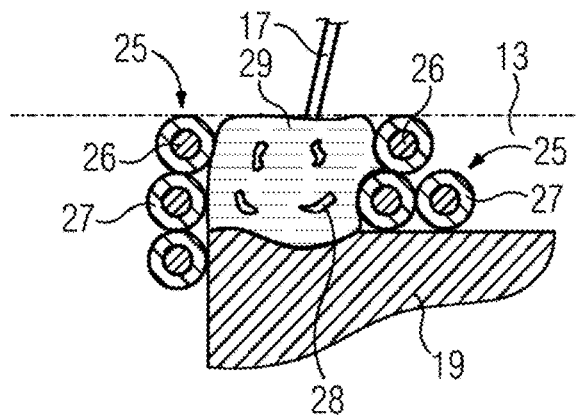

FIG. 3 shows how one part of the powder bed 13 is melted by the laser beam 17, specifically the part which lies at the edge of the component 19. In this case, the cores 26 of the particles 25 are melted. The shells 27 around the cores 26 have a higher melting point and initially still remain in the melt bath, and form shell fragments 28 which remain in the molten material, where they dissolve (alloy formation with the desired alloy composition of the particles). This process may proceed very quickly and is represented here only in model form.

Figure 4:
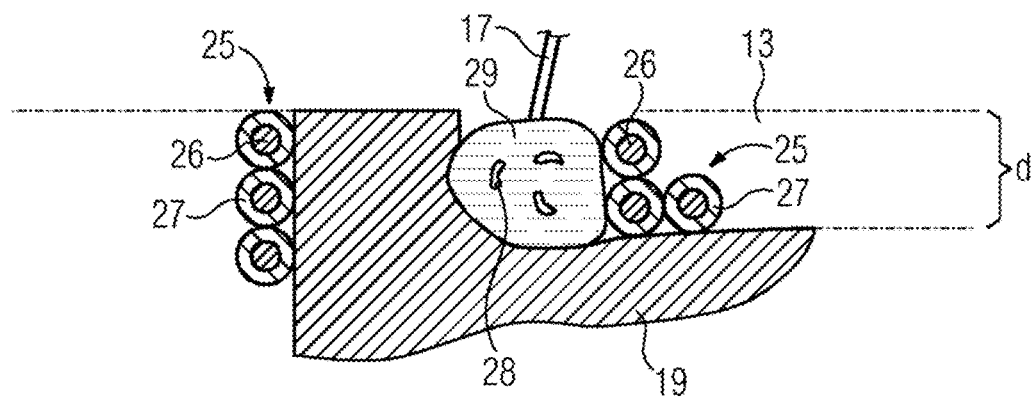

It can be seen in FIG. 4 how the laser 17 is moved over the powder bed 13, with the melt bath, as shown in FIG. 4, traveling from left to right. As it does so, a layer of the component 19 to be produced corresponding to the layer thickness d of the powder bed is formed. If the laser beam 17 travels further, the material solidifies, with formation of the volume of the component at the same time. The effect of the heating indicated in FIG. 1 is that the cooling rate of the material of the component 19 under production is less than 1° C. per second and the formation of alloy is not disrupted by an excessive cooling rate.

Figure 5:
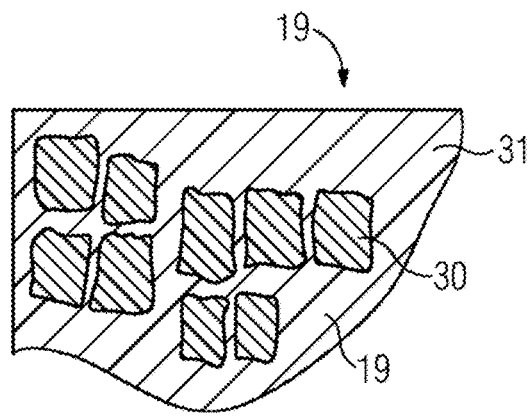
FIG. 5 depict a detail of an exemplary embodiment of the component produced in accordance with FIGS. 2 to 4.

In FIG. 5, the completed component can be seen. It is represented schematically as a ground section. The material of which the component 19 is made is a nickel-based superalloy. The controlled cooling rate has successfully had the effect of achieving a high proportion of so-called γ' precipitates 30 composed of intermetallic phases. They are embedded in a matrix 31 of the component. Consequently, by selective laser melting, it is possible to achieve a component microstructure of a kind hitherto generatable, according to the prior art, only by casting, of turbine blades, for example. The microstructure therefore differs from the microstructure of the particles processed.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for generating a component by powder-bed-based additive production, the method comprising:
providing a powder having a plurality of particles, wherein each particle of the powder comprises a core and shell, wherein the core of each particle comprises a first metallic alloy composition having at least 50 mass % nickel, wherein the shell comprises a second metallic alloy composition having a different composition than the first metallic alloy composition, wherein the second metallic alloy composition comprises cobalt, iron, chromium, molybdenum, tantalum, tungsten, or combinations thereof, and wherein a melting temperature of the first metallic alloy composition is lower than a melting temperature of the second metallic alloy composition;
forming a layer of a powder bed by melting or sintering a portion of the particles of the powder with an energy beam;
heating the powder bed to a temperature below a melting temperature of the particles; and
repeating the forming of at least one additional layer of the powder bed by melting at least one additional portion of the particles of the powder to form the component.

2. The method of claim 1, wherein the shell of the particles has a thickness of at least 0.1 μm and at most 3 μm.

3. The method of claim 1, wherein the particles have a particle size of at least 10 μm and at most 100 μm.

4. The method of claim 1, wherein the melting or sintering of the portion of the particles of the powder and the melting of the at least one additional portion of the particles of the powder comprises electron beam melting.

5. The method of claim 1, wherein the first metallic alloy composition is a superalloy.

6. The method of claim 5, wherein the heating of the powder bed comprises heating the powder bed to a temperature of at least 800° C. and at most 1200° C.

7. The method of claim 6, further comprising:
cooling the temperature of the powder bed down at a rate of at most 1° C./s following formation of the component.

8. The method of claim 1, wherein the particles have an average particle size in a range of 25 μm to 30 μm.

9. The method of claim 1, wherein the shell of the particles comprises tungsten or chromium.

10. The method of claim 1, wherein the shell comprises more than 99 mass % of an element that has a highest melting temperature of elements within the first metallic alloy composition and the second metallic alloy composition of the particle.

11. The method of claim 10, wherein the element is tungsten.

* * * * *